US008530608B2

(12) United States Patent
McGee et al.

(10) Patent No.: US 8,530,608 B2
(45) Date of Patent: Sep. 10, 2013

(54) WATER-BASED ADHESIVE FOR LAMINATION OF POLYMERS TO METAL SUBSTRATES

(75) Inventors: John D. McGee, Troy, MI (US); Brian D. Bammel, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 281 days.

(21) Appl. No.: 12/889,713

(22) Filed: Sep. 24, 2010

(65) Prior Publication Data

US 2011/0076486 A1 Mar. 31, 2011

Related U.S. Application Data

(60) Provisional application No. 61/245,736, filed on Sep. 25, 2009.

(51) Int. Cl.
*C08G 63/00* (2006.01)
*C08G 63/91* (2006.01)

(52) U.S. Cl.
USPC ........... 528/271; 528/425; 528/480; 528/490; 528/491; 528/44

(58) Field of Classification Search
USPC .................... 528/44, 271, 425, 480, 490, 491
See application file for complete search history.

(56) References Cited

U.S. PATENT DOCUMENTS 5,608,000 A * 3/1997 Duan et al. .................... 524/591
6,277,912 B1 * 8/2001 Ashihara et al. ................ 525/65
6,881,788 B2 * 4/2005 Shimizu et al. ............... 524/840
2007/0248810 A1 * 10/2007 McGee et al. ................ 428/323
2010/0062200 A1 * 3/2010 Domes et al. ............... 428/35.8

FOREIGN PATENT DOCUMENTS

| JP | 200973920 A | 4/2009 |
| JP | 2010235710 A | 10/2010 |
| WO | 2008110480 A1 | 9/2008 |

OTHER PUBLICATIONS

International Search Report; 4 pages; Dated Jan. 21, 2011.
Database WPI; Thomson Scientific, London, GB 2009-G92006; 2 pages.

* cited by examiner

*Primary Examiner* — Thao T. Tran
(74) *Attorney, Agent, or Firm* — Mary K. Cameron (57) ABSTRACT

What is disclosed is a water-based adhesive composition that is an aqueous dispersion or emulsion of a polymer component having functional groups that are inactive in a reversible manner in the adhesive composition as prepared; and a water-soluble, or water emulsion, or dispersion of a cross linker component having functional groups wherein the functional groups are inactive in a reversible manner in the adhesive composition as prepared. Preferably the adhesive composition has a pH of from 7 to 11 and a volatile stabilizing base component is used to inactivate the functional groups and to provide the pH. The functional groups in the polymer component and the cross linker component are activated when the volatile base is removed during lamination heat treatment. The adhesive composition can be used to adhere a variety of plastic films to metal substrates without reliance on non-water-based adhesives.

17 Claims, 1 Drawing Sheet

WATER-BASED ADHESIVE FOR LAMINATION OF POLYMERS TO METAL SUBSTRATES

RELATED APPLICATIONS

This application claims the benefit of U.S. provisional application Ser. No. 61/245,736 filed Sep. 25, 2009.

STATEMENT REGARDING FEDERALLY SPONSORED RESEARCH

NONE

TECHNICAL FIELD

This invention relates generally to adhesives to bond plastic films to metal substrates and, more particularly to thin layer water-based adhesives for bonding plastic films, such as polyolefin film, to metal substrates in a lamination process.

BACKGROUND OF THE INVENTION

Many adhesives used to bond or laminate plastic film, such as polyolefin film, to metals are not water-based. These adhesives frequently use solvents other than water, e.g. organic solvents, and the like, and they are often flammable and not environmentally friendly. In these adhesives, the solvent serves as the carrier for the active adhesive components which are dissolved or dispersed in it and this solvent must be driven away during the application and lamination process. Removal of these solvents poses concerns to the environment and requires handling precautions stemming from the flammability of the solvents. In addition, cleaning adhesives that are not water-based from equipment can be difficult and time consuming. Many processes for bonding plastic films to metal surfaces involve other steps that need to be performed prior to the lamination step. Such steps may include applications of inorganic conversion coatings such as phosphate pretreatments; application and drying of primer layers such as solvent-based primers, and application and drying of the adhesives. Following these pretreatment steps, the plastic film is then laminated to the layered metal surface either using a preformed sheet/film of plastic or the plastic is extruded onto the adhesive coated metal substrate. In such cases, the total thickness of the preparation layers between the metal and the plastic film may range from 8 to 40 microns or more. For many applications using these prior art adhesives these multiple coating layers are required to obtain a proper balance between adhesion of the film to the metal surface and corrosion resistance of the laminate.

In the art of coiled metal rolls, it is very desirable to have an adhesive that can be applied to the metal prior to coiling it wherein the adhesive coated coiled metal can later be unrolled and used to laminate a plastic film to the metal. One hindrance has been that many current adhesives exhibit a phenomena know in the art as blocking. In the context of coiled metal, the term blocking refers to the effect many adhesives have of bonding the metal to itself such that the coil can not be uncoiled. This effect occurs when the still warm metal, having an adhesive coating, is rolled into a coil. The warm metal causes sufficient activation of the adhesive such that the coil can not be subsequently unrolled because it is stuck onto itself by the adhesive. This is known in the art of coiled metal as blocking. One current way to prevent blocking is to include additional extreme cooling steps after application of the adhesive to prevent its activation. Blocking is more severe with adhesive polymers having low softening temperatures because the metal temperature during the rolling step is often near to the polymer softening temperature. Thus, many desirable adhesive polymers can not be used on metal that will be coiled unless one includes additional quick cooling steps. Blocking is also a problem in the industry because often it is desirable to take the metal substrate, coat it with an adhesive layer and then roll into a coil for transport to a different location where it may under go further treatment followed by lamination of a plastic film onto the substrate. In such a process, if the adhesive causes blocking then the process can not be followed, without extra cooling steps, because the coil once formed can not be unrolled.

It is desirable to create an adhesive composition that does not rely on non-water solvents such as those currently in use because of the environmental, clean up, and flammability issues of these solvents. To that end it would be desirable to develop a water-based adhesive composition that would have minimal impact on the environment, be easy to clean up and be non-flammable. In addition, it is desirable to create an adhesive composition that can be used in thinner application layers and preferably still provide both adhesion and corrosion resistance. In addition, it is desirable to create an adhesive composition that can be applied to a warm metal substrate, dried in place and then the substrate recoiled while the metal is still warm with reduced or no blocking effect. It is also desirable to provide an adhesive composition that can accommodate addition of adhesive polymers that have low softening temperatures without leading to blocking in coiled metal rolls that are recoiled while warm. Finally, it is desirable to reduce the cost of adhering plastic films to metals and to reduce processing time.

SUMMARY OF THE INVENTION

In general terms, this invention provides a water-based adhesive composition that can be used to laminate plastic films to metal substrates. The metal may be untreated, pretreated with an inorganic conversion coating optionally containing polymer components and/or optionally coated with an organic primer layer prior to application of the adhesive composition. The present invention comprises a water-based adhesive composition comprising: an aqueous dispersion or emulsion of a functional polymer component having adhesive functional groups that are reversibly inactive in the adhesive composition as prepared; and a water-soluble, or water-dispersed cross linker component having functional groups wherein the cross linker functional groups are also inactive in a reversible manner in the adhesive composition as prepared, and the adhesive composition has a pH of from 7 to 12. The reversible blocking or inactivation of active groups in compositions is known in the chemical arts. In the present invention the inactivation of the reactive groups is preferably accomplished by volatile components in the adhesive composition that can be driven off during heated drying or they are responsive to heat activation. The adhesive composition with reversible inactivation of the active functional groups can be applied to a metal substrate or a plastic film and then the functional groups can be activated so that the adhesive will bond the plastic film to the metal substrate. The invention can provide an effective means for lamination without reliance on the prior non-water-based adhesives. In a preferred embodiment the present invention can provide both a metal treatment, which also functions as a primer, and an adhesive in a single layer. The present invention as a sole treatment can function as both an adhesive and as a protective coating to the metal when used at an applied thickness as low as many conventional conversion coatings, which may be as low as 100 milligrams/square foot in the dry applied state. Because of the effectiveness of the invention at very thin application thickness, the invention enables significant cost and/or weight savings for many applications. Multi-layered systems can be replaced with a single, much thinner layer that provides equal or better adhesion and corrosion resistance. It is expected that the present invention can reduce both processing costs and time by utilizing a simplified process having fewer unit operations.

The adhesive composition of the present invention also does not exhibit the blocking phenomena which has been a problem in coiled metal rolls of the past. The adhesive's anti-blocking feature enables application to a metal substrate, coiling the substrate while still warm, optionally transporting it, and then uncoiling the substrate and adhering the plastic film to the metal using the previously applied adhesive. The adhesive composition also allows for use of functional polymers that have much lower softening temperatures than could be used in past systems without blocking occurring on the metal substrates when they are recoiled while still warm. In addition, the invention provides a reduction in the plant space required since the adhesive metal treatment can be applied and the film laminated in a virtually simultaneous fashion; if recoiling before lamination is desired, cooling steps and equipment are not needed to prevent blocking.

In one embodiment, the present invention is a water-based adhesive composition for laminating polymeric films to a metal substrate comprising: an aqueous dispersion or emulsion of a functional polymer component having a plurality of functional groups comprising at least one of carboxylic acid groups, hydroxyl groups, or mixtures thereof, wherein the functional groups are inactive in the adhesive composition as prepared; a water-soluble, or water emulsion, or dispersion of a cross linker component, the cross linker component comprising at least one of ammonium zirconium carbonate, zinc ammonium zirconium carbonate, a carbodiimide, a polyamide epichlorohydrin resin, a polyfunctional aziridine, or mixtures thereof and having functional groups wherein the functional groups are reversibly inactive in the adhesive composition as prepared; and wherein the adhesive composition has a pH of from 7 to 11 and wherein the functional groups on the functional polymer component and the functional groups on the cross linker component are capable of being made reactive by at least one of volatization of ammonia, heated drying, a shift in pH, dehydration, or a combination thereof.

In another embodiment, the present invention is a water-based adhesive composition for laminating polymeric films to a metal substrate wherein the functional polymer component comprises an acid functional polyolefin, a functional polyurethane, an acrylic co-polymer, a polyethylene acrylic acid copolymer, a maleated polypropylene polymer, or a mixture thereof.

In another embodiment, the present invention is a water-based adhesive composition for laminating polymeric films to a metal substrate wherein the cross linker functional groups are capable of bonding to the functional polymer component, a metal substrate, or both the functional polymer component and the metal substrate.

In another embodiment, the present invention is a water-based adhesive composition for laminating polymeric films to a metal substrate wherein the cross linker component comprises at least one of ammonium zirconium carbonate, zinc ammonium zirconium carbonate, or a mixture thereof and the cross linker component is present in an amount of from 1 to 50% by weight based on the total combined active cross linker and active functional polymer component weight.

In another embodiment, the present invention is a water-based adhesive composition for laminating polymeric films to a metal substrate wherein the cross linker component comprises at least one of ammonium zirconium carbonate, zinc ammonium zirconium carbonate, or a mixture thereof and the cross linker component is present in an amount of from 25 to 50% by weight based on the total combined active cross linker and active functional polymer component weight.

In another embodiment, the present invention is a water-based adhesive composition for laminating polymeric films to a metal substrate wherein the cross linker component comprises at least one of a carbodiimide, a polyamide epichlorohydrin resin, a polyfunctional aziridine, or mixtures thereof and the cross linker component is present in an amount of from 1 to 25% by weight based on the total combined active cross linker and active functional polymer component weight.

In another embodiment, the present invention is a water-based adhesive composition for laminating polymeric films to a metal substrate further comprising at least one of a phosphonate, a phosphate, a wetting agent, a non-ionic surfactant, vanadium pentaoxide, molybdenum, chromium, cysteine, or mixtures thereof.

In another embodiment, the present invention is a metal substrate, adhesive, plastic film laminate intermediate comprising: a metal substrate; a water-based adhesive composition comprising an aqueous dispersion or emulsion of a functional polymer component having a plurality of functional groups comprising at least one of carboxylic acid groups, hydroxyl groups, or mixtures thereof and a water-soluble, or water emulsion, or dispersion of a cross linker component comprising at least one of ammonium zirconium carbonate, zinc ammonium zirconium carbonate, a carbodiimide, a polyamide epichlorohydrin resin, a polyfunctional aziridine, or mixtures thereof, the cross linker component having functional groups wherein the functional groups are capable of bonding to the functional polymer component, the metal substrate, or both the functional polymer component and the metal substrate; and the water-based adhesive applied to the metal substrate and dried in place in an amount of from 100 milligrams per square foot to 1 mils in thickness on a dry applied state basis.

In another embodiment, the present invention is a metal substrate, adhesive, plastic film laminate intermediate wherein the functional polymer component comprises an acid functional polyolefin, a functional polyurethane, an acrylic co-polymer, a polyethylene acrylic acid copolymer, a maleated polypropylene polymer, or a mixture thereof.

In another embodiment, the present invention is a metal substrate, adhesive, plastic film laminate intermediate wherein the cross linker component comprises at least one of ammonium zirconium carbonate, zinc ammonium zirconium carbonate, or a mixture thereof and the cross linker component is present in an amount of from 1 to 50% by weight based on the total combined active cross linker and active functional polymer component weight.

In another embodiment, the present invention is a metal substrate, adhesive, plastic film laminate intermediate wherein the adhesive composition is bonded directly to the metal substrate.

In another embodiment, the present invention is a metal substrate, adhesive, plastic film laminate intermediate wherein the cross linker component is present in an amount of from 25 to 50% by weight based on the total combined active cross linker and active functional polymer component weight and the dried adhesive has a morphology of a continuous inorganic phase and a dispersed functional polymer phase.

In another embodiment, the present invention is a metal substrate, adhesive, plastic film laminate intermediate wherein the cross linker component comprises at least one of a carbodiimide, a polyamide epichlorohydrin resin, a polyfunctional aziridine, or mixtures thereof and the cross linker component is present in an amount of from 1 to 25% by weight based on the total combined active cross linker and active functional polymer component weight.

In another embodiment, the present invention is a metal substrate, adhesive, plastic film laminate intermediate wherein the adhesive composition further comprises at least one of a phosphonate, a phosphate, a wetting agent, a non-ionic surfactant, vanadium pentaoxide, molybdenum, chromium, cysteine, or mixtures thereof.

In another embodiment, the present invention is a metal substrate, adhesive, plastic film laminate intermediate wherein the metal substrate has been pre-treated with at least one of an anti-corrosion pre-treatment, a conversion coating pre-treatment, a primer pre-treatment, or combinations thereof prior to application of the adhesive composition to the metal substrate and wherein the cross linker component comprises at least one of a carbodiimide, a polyamide epichlorohydrin resin, a polyfunctional aziridine, or mixtures thereof.

In another embodiment, the present invention is a laminate comprising: an adhesive composition located between a metal substrate and a plastic film; the adhesive composition comprising an aqueous dispersion or emulsion of a functional polymer component having a plurality of functional groups comprising at least one of carboxylic acid groups, hydroxyl groups, or mixtures thereof wherein the functional groups of the functional polymeric component are bonded to the plastic film and a water-soluble, or water emulsion, or dispersion of a cross linker component, the cross linker component comprising at least one of ammonium zirconium carbonate, zinc ammonium zirconium carbonate, a carbodiimide, a polyamide epichlorohydrin resin, a polyfunctional aziridine, or mixtures thereof and having functional groups wherein the functional groups are bonded to the functional polymer component, the metal substrate, or both the functional polymer component and the metal substrate; the adhesive composition applied to the metal substrate in a dried in place amount of from 100 milligrams per square foot to 1 mils in thickness on a dry applied state basis; and the adhesive composition bonding the plastic film to the metal substrate.

In another embodiment, the present invention is a laminate wherein the metal substrate has been pre-treated with at least one of an anti-corrosion pre-treatment, a conversion coating pre-treatment, a primer pre-treatment, or combinations thereof prior to application of the adhesive composition to the metal substrate.

In another embodiment, the present invention is a laminate wherein the adhesive composition is bonded directly to the metal substrate.

In another embodiment, the present invention is a laminate wherein the functional polymer component comprises an acid functional polyolefin, a functional polyurethane, an acrylic co-polymer, a polyethylene acrylic acid copolymer, a maleated polypropylene polymer, or a mixture thereof.

In another embodiment, the present invention is a laminate wherein the cross linker component comprises at least one of ammonium zirconium carbonate, zinc ammonium zirconium carbonate, or a mixture thereof and the cross linker component is present in an amount of from 1 to 50% by weight based on the total combined active cross linker and active functional polymer component weight.

In another embodiment, the present invention is a laminate wherein the cross linker component comprises at least one of ammonium zirconium carbonate, zinc ammonium zirconium carbonate, or a mixture thereof and the cross linker component is present in an amount of from 25 to 50% by weight based on the total combined active cross linker and active functional polymer component weight and the dried adhesive has a morphology of a continuous inorganic phase and a dispersed functional polymer phase.

In another embodiment, the present invention is laminate wherein the cross linker component comprises at least one of a carbodiimide, a polyamide epichlorohydrin resin, a polyfunctional aziridine, or mixtures thereof and the cross linker component is present in an amount of from 1 to 25% by weight based on the total combined active cross linker and active functional polymer component weight.

In another embodiment, the present invention is a water-based adhesive composition for bonding metal to polymeric films further comprising at least one of a phosphonate, a phosphate, a wetting agent, a non-ionic surfactant, vanadium pentaoxide, molybdenum, chromium, cysteine, or mixtures thereof.

In another embodiment, the present invention is a laminate wherein the plastic film comprises a sheeted or extruded plastic comprising at least one of a polyethylene-based film, a polypropylene-based film, a vinyl film, a polyester film, a polyamide film, an acrylic film, a thermoplastic olefin film, or a mixture thereof.

In another embodiment, the present invention is method of preparing a laminate comprising the steps of: providing a metal substrate; providing a water-based adhesive composition comprising an aqueous dispersion or emulsion of a functional polymer component having a plurality of functional groups comprising at least one of carboxylic acid groups, hydroxyl groups, or mixtures thereof and a water-soluble, or water emulsion, or dispersion of a cross linker component, said cross linker component comprising at least one of ammonium zirconium carbonate, zinc ammonium zirconium carbonate, a carbodiimide, a polyamide epichlorohydrin resin, a polyfunctional aziridine, or mixtures thereof and having functional groups wherein the functional groups are capable of bonding to the functional polymer component, the metal substrate, or both the functional polymer component and the metal substrate; providing a plastic film, wherein functional groups on said functional polymer component are capable of bonding to said plastic film; applying the water-based adhesive composition to the metal substrate, the plastic film, or both at a level sufficient to provide from 100 milligrams per square foot to 1 mils in thickness in the dried state; optionally, dewatering the adhesive composition applied to the metal substrate by heating the metal substrate to a peak metal temperature of from 45 to 150° C.; and heating the metal substrate to a peak metal temperature of from 130 to 250° C. and applying the plastic film to the heated metal substrate with the adhesive composition located between them and laminating the plastic film to the metal by applying pressure.

In another embodiment, the present invention is a method of preparing a laminate comprising providing a metal substrate that has been pre-treated with at least one of an anti-corrosion pre-treatment, a conversion coating pre-treatment, a primer pre-treatment, or combinations thereof.

In another embodiment, the present invention is a method of preparing a laminate comprising providing a functional polymer component comprising an acid functional polyolefin, a functional polyurethane, an acrylic co-polymer, a polyethylene acrylic acid copolymer, a maleated polypropylene polymer, or a mixture thereof.

In another embodiment, the present invention is a method of preparing a laminate comprising providing a cross linker component comprising at least one of ammonium zirconium carbonate, zinc ammonium zirconium carbonate, or a mixture thereof and said cross linker component is present in an amount of from 1 to 50% by weight based on the total combined active cross linker and active functional polymer component weight.

In another embodiment, the present invention is a method of preparing a laminate comprising providing the cross linker component in an amount of from 25 to 50% by weight based on the total combined active cross linker and active functional polymer component weight and the dried adhesive has a morphology of a continuous inorganic phase and a dispersed functional polymer phase.

In another embodiment, the present invention is a method of preparing a laminate comprising providing a cross linker component comprising at least one of a carbodiimide, a polyamide epichlorohydrin resin, a polyfunctional aziridine, or mixtures thereof and the cross linker component is present in an amount of from 1 to 25% by weight based on the total combined active cross linker and active functional polymer component weight.

In another embodiment, the present invention is a method of preparing a laminate comprising providing an adhesive composition further comprising at least one of a phosphonate, a phosphate, a wetting agent, a non-ionic surfactant, vanadium pentaoxide, molybdenum, chromium, cysteine, or mixtures thereof.

In another embodiment, the present invention is a method of preparing a laminate comprising providing a plastic film comprising at least one of a polyethylene-based film, a polypropylene-based film, a vinyl film, a polyester film, a polyamide film, an acrylic film, a thermoplastic olefin film, or a mixture thereof.

These and other features and advantages of this invention will become more apparent to those skilled in the art from the detailed description of a preferred embodiment.

DETAILED DESCRIPTION OF A PREFERRED EMBODIMENT

The present invention is directed to a water-based adhesive composition that can be used to bond plastic films to metal substrates. In the present specification and claims, the term lamination includes both bonding a preformed plastic film to the substrate using the inventive adhesive composition and direct extruding a plastic film onto a metal substrate precoated with the inventive adhesive composition. The present adhesive composition is in contrast to the prior art non-water-based compositions in that it is a water-based emulsion or dispersion. Meaning water is the principal carrier composition. In one embodiment, water is from 100 weight % to 80 weight % of the carrier. The preferred plastic films laminated onto the metal substrates in the present invention include sheeted or extruded low surface energy polymeric films such as polyethylene or polypropylene based films, vinyl films such as polyvinylchloride (PVC) films, polyester films such as polyethylene terephthalate (PET or PETE), polyimide films and acrylic films. The term "low surface energy polymeric film" will be understood by those of skill in the art as meaning film having non-polar surfaces The films can be high density, low density, linear low density polyolefin's and other forms of polyolefin films. The films can also include polypropylene or polyethylene co-polymer films, thermoplastic olefins (TPOs) and the like. These films may optionally be pre-treated with special treatments for polyolefin based films including corona-treatments, flame ionization treatments and others which are widely known in the art. The thickness of the film may vary significantly depending on the application. In some applications the film is laminated to a single metal surface in which instance the film is generally very thin on the order of 25 microns or more in thickness. In one embodiment, the film thickness ranges from 30 to 500 microns in thickness. In other applications of the present invention a relatively thick film may be laminated between two metal surfaces to form a metal-film-metal laminate. In these applications the film may have a thickness of from 25 microns up to 1 centimeter. Such metal-film-metal laminates find use in sound and vibration dampening environments. As stated above, the films can either be preformed prior to lamination or they can be extruded directly onto a metal substrate that has been pre-coated with the inventive adhesive composition.

The metal substrates that the films are bonded to via the present process are generally either a metal substrate or vacuum metalized films and foils which are bonded to a low surface energy sheet material such as those based on a polyolefin, vinyl films such as polyvinylchloride (PVC) films, polyester films such as polyethylene terephthalate (PET or PETE), polyamide films and acrylic films. The metal substrates can include untreated metals such as: steel, cold rolled steel, modified steels such as those that have been galvanized or tin-plated, zinc, aluminum, aluminum alloys, Fe-based metals either uncoated or coated with zinc and/or aluminum, and metal foils used in packaging. If desired, the metal substrates can optionally be pre-treated with special surface treatments steps such as phosphate-based conversion coatings used alone or alternatively in conjunction with conventional primer coatings and other metal pretreatment coatings.

The adhesive composition of the present invention is an aqueous water-based adhesive composition comprising an aqueous dispersion or emulsion of a functional polymer component in which the functional groups are largely unreactive in the adhesive composition as prepared. In the present specification and claims the term polymer is a broad term meant to encompass any polymer regardless of the number of different monomers used to form it and includes homo-polymers made from a single monomer. Preferred functional groups on the adhesive functional polymer component are acid groups, such as carboxylic acid, and hydroxyl groups. As stated above these functional groups are largely unreactive in the adhesive composition as initially prepared. Preferred adhesive functional polymer component classes include: acid functional polyolefins, functional polyurethanes in the form of polyurethane dispersions that include a polyurethane backbone with pendant groups that contain the functional carboxylic acid or hydroxyl groups, and acrylic copolymers having pendant functional carboxylic acid or hydroxyl groups. In the present specification acrylic copolymers means a copolymer comprising at least one of acrylic acid, methacrylic acid, esters of acrylic acid, esters of methacrylic acid, and styrene. Effective functional polymer components are those which can be considered essentially non-reactive in the adhesive composition as prepared at ambient temperatures, but which can become reactive either by heated drying, by a pH shift in the adhesive composition associated with volatilization of the blocking compound, ammonia and/or by volatilization of water out of the composition, or by exposure to high temperature conditions occurring at the time of lamination.

Ways to incorporate acid monomers into the polymerization of polyolefins to create the functionalized polyolefin functional polymer component are widely known in the art. Representative suitable acid functional polyolefins include polyethylene acrylic acid co-polymers and maleated polyolefins such as maleated polypropylene co-polymers. Methods to maleate polyolefins such as propylene are also widely known and are described by U.S. Pat. No. 5,955,547. Representative examples of suitable polyethylene acrylic acid co-polymers include co-polymers commercially available from Dow Chemical under the name of Primacor®. Representative examples of maleated polyolefins are those commercially available from Honeywell Performance Additives such as A-C® 596 and A-C® 597. Other useful co-polymers include the Epolene® E-series polymers commercially available from Westlake Longview Corporation. In U.S. Pat. No. 5,585,192 methods are disclosed for preparing emulsions of polyolefins bearing carboxylic acid groups. One particularly preferred maleated polypropylene supplied in the form of an aqueous emulsion is Michem® Emulsion 91735 commercially available from Michelman. Another preferred example of an acid bearing polyolefin in emulsion form which further comprises hydroxyl groups is Advantis® 510W from Eastman Chemical. Methods of preparing aqueous dispersions of ethylene acrylic acid co-polymers are widely known using amines such as ammonia and monoethanolamine, alkali metal hydroxides, alkaline earth metal hydroxides and mixtures of amines and strong bases. See U.S. Pat. Nos. 3,389,109; 3,872,039; 3,899,389; 4,181,566; 5,206,279; and 5,387,635 for processes to prepare these components. The preparation of an aqueous dispersion of polyethylene acrylic acid co-polymer in an aqueous solution of sodium hydroxide and ethanolamine is described in example 19 of U.S. Pat. No. 5,387,635. Examples of commercially available ethylene acrylic acid copolymer dispersions include Michem® Prime 2960, Michem® Prime 4983R, Michem® Prime 4990R, Miehem® Prime 5931, and Michem® Prime 4983-40R. Representative examples of functional polyurethane dispersions are Hauthane HD2001, HD4664, L2255 and L2245 all from Hauthway Corporation.

The adhesive composition of the present invention also includes a water-soluble, or water emulsion or dispersion of a cross linker component having functional groups wherein the functional groups are also largely unreactive in the adhesive composition as prepared. The adhesive composition as prepared preferably has a pH of at least about, in increasing order of preference 7, 7.5, 8, 8.5, 9 and not more than about, in increasing order of preference 12, 11.5, 11, 10.5, 10, 9.5. In a preferred embodiment a volatile base, such as ammonia, is incorporated to increase pH and to aid in suppressing reaction of the functional groups of the polymer component and the cross linker component in the adhesive composition as prepared.

Effective cross linker components possess functional groups which are reactive with the substrate, or the functional groups on the functional polymer component, or preferably with both. Effective cross linker components are those which can be considered essentially non-reactive in the adhesive composition as prepared at ambient temperatures, but which can be activated either by heated drying, by a pH shift in the adhesive composition associated with volatilization of the blocking compound ammonia and/or by volatilization of water out of the composition, or by exposure to high temperature conditions occurring at the time of heated drying. The cross linker component may be water-soluble, an emulsion in water, or in a dispersed state in water. Preferred water soluble inorganic cross linker components include inorganic compositions of ammonium zirconium carbonate solutions such as Bacote® 20, or the HiCharms ammonium zirconium carbonate commercially available from HiCharms Ltd., or zinc ammonium zirconium carbonate solutions such as Protec ZZA™, commercially available from Magnesium Elektron Inc. In these cross linker components, ammonia and carbonate are the stabilizing agents that block the functional groups on the cross linker component in the adhesive composition as prepared. The ammonia and carbonate can be evaporated away to activate the functional groups on the cross linker and functional polymer components. These inorganic cross linker components are most effective when the substrate is a bare metal surface. When the cross linker component is an inorganic composition a preferred weight % of active inorganic cross linker component, based on the total combined active inorganic cross linker component and active functional polymer component weight, can be 1%, 2%, 3%, 4%, 5%, 6%, 7%, 8%, 9%, 10%, 11%, 12% 13%, 14%, 15%, 16%, 17%, 18%, 19%, 20%, 21%, 22%, 23%, 24%, 25% and need not be more than 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%. In a preferred embodiment, this amount is 1% to 50%, more preferably 3% to 40%, and most preferably 5% to 30%. Preferred water-soluble organic cross linker components include carbodiimides such as Carbodilite® SV-02 and Carbodilite® V-02-L2, commercially available from Nisshinbo Chemical Inc. A preferred carbodiimide cross linker component in emulsion form is Carbodilite® E-02, also commercially available from Nisshinbo Chemical Inc. The carbodiimides are very reactive with carboxylic acid functional groups. The Nisshinbo Carbodilite® series are described by Nisshinbo as polycarbodiimide resins with carbodiimide groups and a hydrophilic segment. The carbodiimide functional cross linker components are well-suited for application over primed metal surfaces or metal surfaces that have an anti-corrosion pretreatment applied to them. Additional preferred classes of organic cross linker components include polyamide epichlorohydrin resins and modifications thereof such as those marketed under the name of Polycup™ resins from Hercules and polyfunctional aziridines. When the cross linker component is an organic cross linker a preferred weight % of active organic cross linker component, based on the total combined active cross linker component and active functional polymer component weight, can be 1%, 2%, 3%, 4%, 5%, 6%, 7%, 8%, 9%, 10%, 11%, 12% and need not be more than 25%, 24%, 23%, 22%, 21%, 20%, 19%, 18%, 17%, 16%, 15%, 14%, 13%. In a preferred embodiment this amount is 1 to 25%, more preferably 2% to 20%, and most preferably 5% to 15. The adhesive composition can include a single cross linker component or combinations of cross linker components depending on the substrates to be bonded.

In one preferred embodiment of the adhesive composition the polyolefin functional polymer component in the adhesive is a maleated polypropylene in emulsion form, 35% active, and the cross linker component is ammonium zirconium carbonate, 20% active. Good adhesion of polypropylene films to metal surfaces can be achieved over a broad range of relative concentrations. A preferred weight % of active ammonium zirconium carbonate, based on the total combined active ammonium zirconium carbonate and active maleated polypropylene emulsion weight, is 1% to 50%, more preferably 3% to 40%, and most preferably 5% to 30. In another preferred embodiment the polyolefin functional polymer component in the adhesive is a maleated polypropylene in emulsion form, 35% active, and the cross linker component is an aqueous solution of polycarbodiimide. A preferred weight % of active carbodiimide, based on the total combined active carbodiimide and active maleated polypropylene emulsion weight, is 1 to 25%, more preferably 2% to 20%, and most preferably 5% to 15.

The adhesive composition can also include other, optional, components. Preferred optional components include phosphonate or phosphate functional additives with Dequese 2010 as a representative example. Dequest® 2010 is available from Monsanto Chemical company and is a mixture of 1-hydroxyethylidene-1,1-diphosphonic acid and phosphonic acid supplied as a 60% solution. Phosphonates or phosphate functional additives can improve the adhesive bond to the metal substrate. Additional water or wetting agents may also be beneficial in the adhesive composition. Representative examples of useful wetting agents include Byk® 347 and Byk® 348, which are silicone surfactants available from BYK-Chemie GmbH. Because the nature by which emulsions or dispersions of functional polymer components stabilized in water varies widely, in some embodiments of the present invention it may be beneficial to introduce a non-ionic surfactant or a mixture of surfactants into the emulsion or dispersion prior to mixing with other components of the adhesive formulation, particularly, soluble inorganic cross linker components such as ammonium zirconium carbonate to avoid phase instability. Non-ionic surfactants are widely known within the industry. One preferred class of nonionic surfactants are made hydrophilic by virtue of polyethyleneoxide chains obtained by polycondensation of ethylene oxide. Although useful nonionic surfactants may possess a very wide range of ethylene oxide units per molecule, suitable surfactants for the present invention typically possess 4 to 70 such units. Families of useful nonionic surfactants include, but are not limited to: ethoxylated alcohols or polyalcohols such as Tergitol 15-S-20; ethoxylated alkyl phenols such as Triton X-100 available from Dow Chemical; and ethylene oxide/propylene oxide copolymers such as the Pluronic line of detergents offered by BASF. Also additional pH modifiers such as volatile amines may be beneficial as a means to suppress or trigger key interactions between the metal substrate, the plastic film, and the reactive functional groups in the adhesive composition. For other applications, corrosion inhibiting components may be desired. Suitable corrosion inhibitor materials include compounds of vanadium such as vanadium pentoxide $V_2O_5$, molybdenum, and/or chromium, which can be used in conjunction with reducing agents such as cysteine or with oxidizing agents for optimum effect. In some cases other optional film forming resins or coalescing agents might be used.

In one embodiment, the adhesive composition may be applied to the metal substrate, or the plastic film or to both prior to the lamination. The adhesive application can be accomplished by any number of processes including roll-coating, spray-application, dipping or by metal drawbar; however the roll-coating method is preferred. After application to a metal substrate, the present adhesive composition can be treated one of two ways depending on the desired outcome. In one embodiment the process is a two step process and in another embodiment the process is a single step process.

In the two step process, the water-based adhesive composition is applied to the metal substrate and heated to a relatively low peak metal temperature of from 45 to 150° C., more preferably from 85 to 100° C. for a sufficient amount of time to dewater the adhesive composition and to drive off some or all of the volatile stabilizing base, such as ammonia, thereby providing a thin layer of dry adhesive film bonded to the metal substrate. This thin layer can function as an anti-corrosion layer on the metal substrate. Under these temperature conditions the cross linker component, for example polymeric zirconium ammonium carbonate and optional phosphonate groups, strongly bind to metal surfaces; they build a matrix with pre-treatment anti-corrosive properties. It is believed that the cross linker may partially react with some of the functional acid groups on the functional polymer component. The metal substrates with the thin layer of dry adhesive can be recoiled and stored for a period of time for use later. In one preferred embodiment, the formulation comprises ammonium zirconium carbonate or one of the other inorganic cross linkers as the cross linker component and it is a direct to metal application. When used in a two step process, the inorganic matrix formed by the cross linker component contributes to a very highly block-resistant applied adhesive layer on the metal substrate which is important when the adhesive coated metal substrate is recoiled at elevated temperatures. Most importantly, the dewatered adhesive compositions exhibit very low or no blocking behavior so the metal substrate can be coiled after application and dewatering of the adhesive composition while still warm for storage prior to bonding with the plastic film. Typical "warm" re-coiling temperatures may range from 37° C. to 50° C. The coiled metal substrate can then be uncoiled at a later time and successfully bonded to the plastic film. This ability to store the coated metal substrates can be very convenient in metal processing because it allows for one facility to coat the metal substrate with the adhesive composition and then to ship the coated metal to another facility for use at a later time in a bonding process.

In the second step of the two step process, the metal substrate with the applied dry adhesive film is heated to a relatively higher peak metal temperature of from 130 to 250° C., more preferably from 180 to 210° C. and then the hot metal substrate is passed through rollers, one of which also applies the plastic film, for example a polyolefin film, to the metal substrate thereby laminating the polyolefin film to the metal substrate. The required temperatures are dependent on the identity of the functional polymer component and the plastic film. At these higher processing temperatures, the molten functional polymer component in the adhesive composition bonds with the film through one or more mechanisms such as chain entanglement, formation of ionic bonds and/or formation of covalent bonds. Once the laminate cools, the bonds are strengthened via crystallization. As noted above, the film that is laminated to the metal substrate can either be a preformed film or the film can be extruded in sheet form directly onto the heated metal substrate and bonded. When the film is direct extruded onto the adhesive coated metal substrate it can be hot enough to cause activation of the adhesive without the need to separately pre-heat the metal. Again, the required temperature depends on the identity of the film and the functional polymer component.

In another embodiment, only a single heating step from ambient temperature to lamination temperature at a peak metal temperature of from 130 to 250° C., more preferably from 180 to 210° C. is used such that dewatering, volatilization of volatile pH modifiers such as ammonia, heat activation of reactive functionalities and melting of the functional polymer component occur in a continuous and/or semi-sequential fashion. The temperatures recited above work well for many films with the present adhesive composition; however, some films may require different temperature ranges depending on the composition and thickness of the film. The heating of the metal substrate can be accomplished by any of the ways known in the art including through use of an infrared lamps, gas-fired ovens, induction ovens or electric ovens. The adhesive composition is effective over a wide range of applied thickness which will vary depending on the application. Depending on the thickness of the adhesive composition the preferred method for measuring the applied dry adhesive will vary. At larger thicknesses direct measurement of the thickness in mils or microns is generally preferred, methods for doing so are known in the art. At thinner thicknesses, dry applied adhesive is better expressed as milligrams of dry adhesive per square foot (mg/sq. ft.) of substrate. A preferred range of dry applied adhesive of the present invention is from 100 mg/sq. ft. to 1.0 mils, more preferably from 150 mg/sq. ft. to 0.35 mils, and most preferably from 175 mg/sq. ft. to 0.2 mils in the dry applied state. A thickness of 1 mils is equal to 25.4 microns.

An additional advantage of the present invention is that the adhesive composition can be cleaned up from equipment using water as opposed to the non-water solvent-based adhesives used in the past. The adhesive composition is also not flammable nor is it environmentally unfriendly relative to the current non-water solvent-based adhesives. As detailed below a series of examples of the present invention were prepared and tested. In the examples emulsion A, the functional polymer component, was a maleated polypropylene emulsion having a nonionic emulsifier and 35% by weight active solids. In the examples cross linker A is a water soluble polycarbodiimide with 40% by weight active solids, a functional equivalent weight of 385 grams/equivalent, and a pH of 9.5. In the examples cross linker B is a water soluble polycarbodiimide with 40% by weight active solids, a functional equivalent weight of 430 grams/equivalent, and a pH of 9.5. In the examples cross linker C is a polycarbodiimide emulsion with 40% by weight active solids, a functional equivalent weight of 445 grams/equivalent, and a pH of 10. Finally, in the examples cross linker D is an ammonium zirconium carbonate solution with approximately 20% by weight $ZrO_2$.

EXAMPLE 1

In a first series of adhesive compositions the functionalized polymer component used was emulsion A. The pH of emulsion A was adjusted to pH 9.0 using ammonium hydroxide, 28.8% $NH_3$ solution. To this emulsion different levels of three cross linker components were added as described below in TABLE 1. In three examples a silicone surfactant wetting agent was also used. All samples were mixed at low speed until uniform. Example 1A is a comparative example in that it does not include a cross linker component and thus is not prepared in accordance with the present invention.

TABLE 1

| Example | Emulsion A | Cross linker A | Cross linker B | Cross linker C | Wetting agent silicone surfactant | Total |
|---|---|---|---|---|---|---|
| 1A (Comparative) | 100.0 | 0.0 | 0.0 | 0.0 | 0.0 | 100.0 |
| 1B | 95.8 | 4.2 | 0.0 | 0.0 | 0.0 | 100.0 |
| 1C | 92.0 | 8.0 | 0.0 | 0.0 | 0.0 | 100.0 |
| 1D | 95.8 | 0.0 | 4.2 | 0.0 | 0.0 | 100.0 |
| 1E | 92.0 | 0.0 | 8.0 | 0.0 | 0.0 | 100.0 |
| 1F | 95.8 | 0.0 | 0.0 | 4.2 | 0.0 | 100.0 |
| 1G | 92.0 | 0.0 | 0.0 | 8.0 | 0.0 | 100.0 |
| 1H | 91.8 | 8.0 | 0.0 | 0.0 | 0.2 | 100.0 |
| 1I | 91.8 | 0.0 | 8.0 | 0.0 | 0.2 | 100.0 |
| 1J | 91.8 | 0.0 | 0.0 | 8.0 | 0.2 | 100.0 |

EXAMPLE 2

In a second series of adhesive compositions the same functional polymer component as in example 1 was used and the pH of emulsion A was adjusted to pH 9.0 using ammonium hydroxide, 28.8% $NH_3$ solution, and then it was used to prepare examples 2A-2D as described below in TABLE 2. All samples were mixed at low speed until uniform. In these examples either an ammonium zirconium carbonate solution, namely, cross linker D or cross linker A from example 1 was used as the cross linker component. In addition, the adhesive compositions included a phosphonate solution which was prepared by mixing 84.3 parts by weight deionized water, 5.7 parts by weigh of a 28% $NH_3$ solution, and 10 parts by weight of 1-hydroxyethylidene-1,1,-diphosphonic acid, Dequest 2010 60% solution.

TABLE 2

| Component | 2A | 2B | 2C | 2D |
|---|---|---|---|---|
| Emulsion A | 93.3 | 86.1 | 77.5 | 83.1 |
| Cross linker D | 3.3 | 7.6 | 13.6 | 0.0 |
| Cross linker A | 0.0 | 0.0 | 0.0 | 7.3 |
| Phosphonate solution | 3.4 | 6.3 | 8.9 | 9.6 |
| Total | 100.0 | 100.0 | 100.0 | 100.0 |

EXAMPLE 3

In a third example a series of adhesive compositions were prepared as described below in TABLE 3. The adhesive compositions were prepared by adding the components in the order listed with low speed mixing until uniform. Each of the adhesive compositions were allowed to age 24 hours in a sealed bottle. Again the functionalized polymer component was emulsion A. All of the adhesive compositions were alkaline in the range of pH 8 or greater. All of the adhesive compositions included cross linker D. One also included cross linker A from example 1. Finally, three of the adhesive compositions also included the corrosion inhibitor $V_2O_5$ and cysteine.

TABLE 3

| Component | 3A | 3B | 3C | 3D |
|---|---|---|---|---|
| Deionized Water | 33.0 | 29.0 | 24.9 | 31.5 |
| Cross linker D | 28.2 | 37.6 | 47.0 | 29.6 |
| Cross linker A | 0.0 | 0.0 | 0.0 | 3.5 |
| $V_2O_5$ | 0.6 | 0.6 | 0.6 | 0.0 |
| Emulsion A | 37.6 | 32.2 | 26.9 | 35.4 |
| Cysteine | 0.6 | 0.6 | 0.6 | 0.0 |
| Total | 100.0 | 100.0 | 100.0 | 100.0 |

EXAMPLE 4

In a series of tests the adhesive compositions from TABLE 1, examples 1B to 1J, and comparative example 1A were applied to pre-primed metal panels using wire-wrapped drawbars as described below in TABLE 4. The metal panels were hot-dipped galvanized steel which had previously been treated with a zinc-phosphate conversion coating and painted with a baked solvent-based phenolic primer. The dry-film thickness of adhesive achieved was determined separately on panels which were dried but not laminated. Drawbar #14 was found to provide an average dry-film adhesive thickness of 0.33 mils after heated drying. Drawbar #8 was found to provide an average dry film adhesive thickness of 0.20 mils after heated drying. After application, the wet adhesive coated panels were heated to a peak metal temperature of 215° C. under an infrared lamp and, within 1-2 seconds, passed between rollers under pressure along with a 6 mils thick plastic polypropylene film to provide contact of hot adhesive coating to plastic polypropylene film thereby laminating and bonding the film to the substrate. The length of plastic polypropylene film used was 3-4 inches longer than the metal panel. After lamination, the laminated panels were allowed to cool to ambient temperature. Adhesion strength was characterized by pulling the non-laminated portion of the film across the laminated area by hand at an angle of 135 degrees relative to the panel surface. Adhesive strength of the laminate was characterized as shown in TABLE 4 below. An adhesion value of 0 means there was no adhesion; an adhesion value of 1 means the polypropylene film can be pulled off with relative ease; an adhesion value of 2 means the film can be pulled off with difficulty; and an adhesion value of 3 means the film could not be pulled off from the metal panel and instead the film tears or cohesively fails. The results represent the average of multiple panels for each adhesive.

TABLE 4

| Adhesive composition | Drawbar # | Adhesion value |
| --- | --- | --- |
| Example 1B | 14 | 2.5 |
| Example 1C | 14 | 3.0 |
| Example 1D | 14 | 2.5 |
| Example 1E | 14 | 3.0 |
| Example 1F | 14 | 2.5 |
| Example 1G | 14 | 3.0 |
| Example 1H | 8 | 3.0 |
| Example 1H | 14 | 3.0 |
| Example 1I | 8 | 3.0 |
| Example 1I | 14 | 3.0 |
| Example 1J | 8 | 3.0 |
| Example 1J | 14 | 3.0 |
| Comparative Example 1A | 14 | 1.0 |

The results demonstrate several important features of the present invention. First, as shown by the results of comparative example 1A compared to all of the examples of the present invention, the cross linker component is necessary to achieve an adhesive bond between the film and the primed metal substrate. Second, all of the adhesive compositions provided an increasing level of adhesion with an increased level of carbodiimide cross linker. Third, there was no apparent adhesive advantage in increasing the adhesive layer from the 0.2 mils achieved with drawbar# 8 to 0.33 mils achieved with drawbar# 14. Both layers provided an adhesive value of 3. Finally, use of the wetting agent in the adhesive composition did not have any adverse effect on the adhesive value.

EXAMPLE 5

Adhesive compositions examples 2A-2D were applied to various untreated metal panels by drawbar to a thickness corresponding to a dry film thickness of 0.3 mils as described below in TABLE 5. After application, the wet-adhesive coated panels were heated to a peak metal temperature of 215° C. under an infrared lamp and laminated to plastic polypropylene film within 1-2 seconds in the fashion of example 4 described above. Upon cooling, the laminates were tested for adhesion of the polypropylene film to the metal in similar fashion to that described in example 4 above for multiple replicates and the results are present in TABLE 5 below.

TABLE 5

| Adhesive composition | Metal Substrate | Adhesion value |
| --- | --- | --- |
| Example 2A | Cold rolled steel | 3.0 |
| Example 2B | Cold rolled steel | 3.0 |
| Example 2C | Cold rolled steel | 3.0 |
| Example 2D | Cold rolled steel | 1.0 |
| Example 2A | Hot-dipped galvanized Steel | 2.75 |
| Example 2B | Hot-dipped galvanized Steel | 3.0 |
| Example 2C | Hot-dipped galvanized Steel | 3.0 |
| Example 2D | Hot-dipped galvanized Steel | 1.5 |
| Example 2A | Aluminum (3003) | 3.0 |
| Example 2B | Aluminum (3003) | 3.0 |
| Example 2C | Aluminum (3003) | 3.0 |
| Example 2D | Aluminum (3003) | 1.0 |

The results demonstrate some interesting trends. First, on untreated cold rolled steel all of the tested levels of ammonium zirconium carbonate cross linker component were very effective in producing superior adhesion. The carbodiimide cross linker component was ineffective even with inclusion of the highest level of the phosphonate additive. On non-pretreated hot-dipped galvanized steel again the ammonium zirconium carbonate cross linker component was very effective in producing superior adhesion, although there was a small reduction at the lowest level used of 3.3%. The carbodiimide cross linker component was more effective on this steel compared to cold rolled steel, but it was largely ineffective in providing good adhesion. Finally, on non-pretreated aluminum the results for the ammonium zirconium carbonate cross linker component versus the carbodiimide cross linker component were the same as for cold rolled steel. Specifically, all of the tested levels of ammonium zirconium carbonate cross linker component were very effective in producing superior adhesion in a direct to metal application. The carbodiimide cross linker component was ineffective even with inclusion of the highest level of the phosphonate additive.

EXAMPLE 6

Hot-dipped galvanized panels were cleaned using a neutral pH aqueous spray cleaner followed by water rinsing until water-break free. Adhesive metal treatment compositions 3A to 3D were applied to the panels using wire-wrapped drawbar #6, which provided a dry coating weight of 175±25 milligram/square foot. After application, one of two drying/laminating processes were utilized. In process #1 the coated panels were first dried at a low peak metal temperature of 93° C. to provide a non-tacky thin-adhesive film and the panels were stacked on top of each other for later use. This 93° C. peak metal temperature was achieved using a Mathis Labdryer type LTH from Werner Mathis A.G. using an oven dwell time of 17 seconds with an air temperature of 300° C. The following day, these dry adhesive-coated panels were heated individually under an infrared lamp to a peak metal temperature of 204° C. and then laminated to a polypropylene film. Then the laminated panels were tested in a similar fashion to that described in example 4 above. In process #2 the wet adhesive coated panels were dried directly at a peak metal temperature of 204° C. using an infrared lamp followed by lamination and testing after cooling in similar fashion to that as described by example 4. Adhesive strength of the laminates prepared are shown below in TABLE 6.

TABLE 6

| Adhesive composition | Process | Adhesion value | Failure Mode |
|---|---|---|---|
| Example 3A | #1 | 3.0 | Cohesive failure of film |
| Example 3B | #1 | 3.0 | Cohesive failure of film |
| Example 3C | #1 | 3.0 | Cohesive failure of film |
| Example 3A | #2 | 3.0 | Cohesive failure of film |
| Example 3B | #2 | 3.0 | Cohesive failure of film |
| Example 3C | #2 | 3.0 | Cohesive failure of film |
| Example 3D | #2 | 3.0 | Cohesive failure of film |

The results demonstrate that even very low coating levels of the present invention, 175 milligrams/square foot, provide an excellent adhesive layer for laminating polyolefin films to metal substrates. The results also show that process #1 was as good as process #2. This demonstrates the flexibility of the present invention. Metal substrates can be coated with the adhesive composition, which can be dried in place, the substrates can be stacked on top of each other or rolled into a coil. At a later time the substrates can be heated to lamination temperatures and films, such as the polypropylene film of example 6, can be laminated to them providing a high level of adhesion. These results will allow for a very expanded use of the present invention which is not available in the current non-water based solvent-based systems.

EXAMPLE 7

In example 7 an adhesive composition according to the present invention for use directly on a metal substrate with no metal pre-treatment, other than cleaning, was prepared by adding the components in TABLE 7, below, in order with low speed mixing until uniform. The functional polymer component is a maleated polypropylene from Michelman Inc., Michem Emulsion 91735, that is 35% by weight active solids. The cross linker D was an ammonium zirconium carbonate solution with approximately 20% by weight $ZrO_2$. The phosphonate solution was prepared by mixing 84.3 parts by weight deionized water, 5.7 parts by weigh of a 28% $NH_3$ solution, and 10 parts by weight of 1-hydroxyethylidene-1, 1,-diphosphonic acid, Dequest 2010 60% solution.

TABLE 7

| Component | Weight % |
|---|---|
| Maleated polypropylene | 49.0 |
| Deionized water | 9.1 |
| Cross linker D | 36.8 |
| Phosphonate solution | 5.1 |

EXAMPLE 8

In example 8 the adhesive composition of example 7 was applied to an aluminum metal substrate as described below. Prior to application of the example 7 adhesive, the 3003 grade aluminum panels were cleaned with an alkaline spray cleaner, Parco® cleaner 1200 available from Henkel Corporation at a 4% concentration, for 10 seconds at 60° C., followed by water rinsing and drying by air-knife. The example 7 adhesive surface treatment composition was applied by drawbar such that a film thickness of the dry adhesive layer of 0.09-0.11 mils was provided on the aluminum panels. The coated panels were then heated under an infra-red lamp to a peak metal temperature of 200° C. After reaching a peak metal temperature of 200° C. the adhesive coated panels were laminated with a polypropylene film as described above in example 4 for testing of the adhesive strength. Once cooled to ambient temperature a strong laminate was obtained as the film could not be removed from the panel by peeling. With peeling action, the bond remained in tact and the polypropylene film tore as evidenced by an adhesive value of 3.0.

EXAMPLE 9

Figure 1:
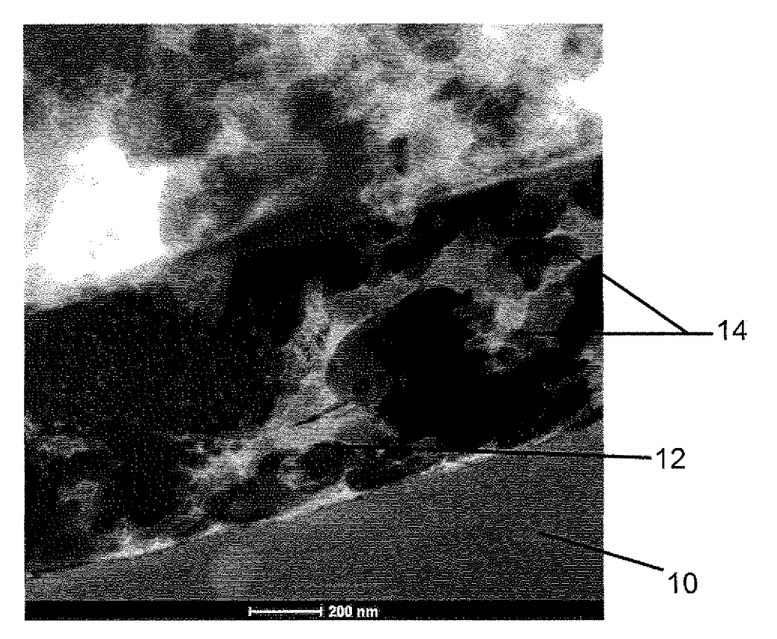

In example 9 one of the laminates from example 8 was cross-sectioned and polished so the metal to adhesive and adhesive to polypropylene film interfaces were exposed. Then a focused gallium ion beam was used to cut away a thin section of the laminate and this was characterized by dark-field scanning transmission electron microscopy. The result is shown in FIG. 1. The FIG. 1 shows that in adhesive compositions prepared according to the present invention when the cross linker component is an inorganic cross linker, such as the ammonium zirconium carbonate or the zinc ammonium zirconium carbonate, and when the cross linker is present in amount of from 25 to 50% based on the total combined active cross linker weight and active functional polymer component weight, then one obtains a unique morphology. The FIG. 1 shows the unique morphology of a continuous inorganic phase with a largely discreet and dispersed functional polymer phase. The relative brightness of the regions within the image reflect the average atomic number Z for that region of the thin section. The size of the observed discreet dispersed functional polymer component spheres within the coating is consistent with the particle size measurements of the polymer emulsion used in the formula shown in TABLE 7. In the FIG. 1 the metal substrate is shown at 10, the continuous inorganic phase is shown, for example, at 12 and the discreet dispersed functional polymer component is shown, for example, at 14. This unique adhesive morphology is associated with much reduced blocking behavior in coils of metals coated with these adhesive compositions. In addition, as shown below this unique morphology is associated with the ability to use as the functional polymer component polymers with much lower softening temperatures than were possible in the prior art systems without causing blocking in coiled metal rolls without cooling prior to rolling. As stated above, this unique morphology is seen when the inorganic cross linker is present in the adhesive composition in amount of from 25 to 50% based on the total combined active cross linker weight and active functional polymer component weight.

EXAMPLE 10

In example 10 a functional polymer component was created according to the present invention using as the functional polymer component an ethylene-acrylic acid copolymer, Michem® Prime 4990R. This co-polymer has a very low Tg and a softening point of 40° C. and because of the low softening point if applied to a warm metal substrate it would require significant cooling of the substrate prior to recoiling. The functional polymer component was created using the components listed in TABLE 10 below by mixing the non-ionic surfactant Tergitol with warm deionized water to form a clear solution. Then the solution was added to the ethylene-acrylic acid copolymer, Michem Prime 4990R, from Michelman Inc., which has 33.5% active solids by weight.

TABLE 10

| Component | Weight % |
| --- | --- |
| Deionized water | 41.9 |
| Tergitol 15-S-20 | 1.2 |
| ethylene-acrylic acid copolymer | 56.9 |

EXAMPLE 11

In example 11 a series of adhesive compositions, examples 11A, 11B and 11C, were prepared according to the present invention using the functional polymer component of example 10 as described below in TABLE 11. The phosphonate solution was prepared as described above in example 7 and the cross linker D is an ammonium zirconium carbonate solution with approximately 20% by weight $ZrO_2$ as described above. A comparative example 12, not according to the present invention, was also prepared without the cross linker D or the phosphonate solution. The examples were used to test the blocking tendency of the adhesives on hot-dipped galvanized steel panels. As discussed above the blocking tendency of an adhesive can limit its usefulness since an adhesive with a high blocking tendency can not be used to pre-coat metal substrates with adhesive followed by storage in a stack or a coil without significant cooling steps being incorporated into the process. Based on the softening point of the functional polymer component used one would expect that the adhesive composition prepared using it should exhibit very high blocking tendency on warm metal substrates.

TABLE 11

| Component | Example 11A | Example 11B | Example 11C | Example 12 comparative |
| --- | --- | --- | --- | --- |
| Polymer Example 10 | 52.1 | 44.7 | 37.3 | 75.4 |
| Deionized water | 23.1 | 23.1 | 23.1 | 24.6 |
| Cross linker D | 22.3 | 29.7 | 37.1 | 0.0 |
| Phosphonate solution | 2.5 | 2.5 | 2.5 | 0.0 |

EXAMPLE 13

To test the blocking tendency of the adhesive compositions the compositions of examples 11A to 11C and comparative example 12 were applied to clean hot-dipped galvanized steel panels. The adhesive compositions were applied by drawbar to a dry coating weight of 200 mg/square foot on each panel and the panels were dried to a peak metal temperature of 93° C. Drying was carried out using a Mathis labdrier with an air temperature of 300° C. and a dwell time of 15 seconds. Upon cooling to ambient temperature 4.4 centimeter by 7.6 centimeter dry adhesive coated panels were prepared by cutting from the center portion of the original coated panels and the edges were deburred. A pair of panels per each adhesive composition were contacted with each other with the adhesive coated sides face to face. Panel pairs for each example 11A to 11C and 12 were then stacked and compressed on a heated press to assess blocking resistance. A load of 2954.5 kilograms was applied and the platens were heated to 60° C. for a period of 30 minutes after which time the panels and apparatus were allowed to cool to ambient temperature. Once fully cooled, the load was removed, the panel pairs separated and the blocking tendency rated. The ratings were determined as follows: a 0 rating means the panels separated easily and slide apart freely; a 1 rating means light force was required to separate the panels; a 2 rating means significant force was required to separate the panels. The results are present below in TABLE 13. The results demonstrate that unexpectedly the adhesive compositions of the present invention allow for use of functional polymer components that have very low softening points without the expected result of a high blocking tendency without a cooling step. This can be important since functional polymer components having very low softening points and very high adhesive properties, so they would be useful in an adhesive composition, have not been used in the past because of their high blocking tendency unless cooling steps are used. The comparative example 12, which did not include the cross linker of the present invention, only the functional polymer, exhibited a very high blocking level as expected.

TABLE 13

| Adhesive sample | Blocking rating |
| --- | --- |
| Example 11A | 1 |
| Example 11B | 0 |
| Example 11C | 0 |
| Example 12, comparative | 2 |

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A water-based adhesive composition; said adhesive composition comprising:
    an aqueous dispersion or emulsion of a maleated polypropylene polymer component having a plurality of carboxylic acid groups, wherein said carboxylic acid groups are inactive in said adhesive composition as prepared;
    a water-soluble, or water emulsion, or dispersion of a cross linker component, said cross linker component comprising at least one of ammonium zirconium carbonate, zinc ammonium zirconium carbonate, a carbodiimide, a polyamide epichlorohydrin resin, a polyfunctional aziridine, or mixtures thereof and having functional groups wherein said functional groups are reversibly inactive in said adhesive composition as prepared; and
    wherein said adhesive composition has a pH of from 7 to 11 and wherein said carboxylic acid groups on said polymer component and said functional groups on said cross linker component becomes reactive with each other by at least one of volatization of ammonia, heated drying, a shift in pH, dehydration, or a combination thereof.

2. A water-based adhesive composition as recited in claim 1 wherein said cross linker functional groups are capable of bonding to said functional polymer component and a metal substrate.

3. A water-based adhesive composition as recited in claim 1 wherein said cross linker component comprises at least one of ammonium zirconium carbonate, zinc ammonium zirconium carbonate, or a mixture thereof and said cross linker component is present in an amount of from 1 to 50% by weight based on the total combined active cross linker and active functional polymer component weight.

4. A water-based adhesive composition as recited in claim 1 wherein said cross linker component comprises at least one of ammonium zirconium carbonate, zinc ammonium zirconium carbonate, or a mixture thereof and said cross linker component is present in an amount of from 25 to 50% by weight based on the total combined active cross linker and active functional polymer component weight.

5. A water-based adhesive composition as recited in claim 1 wherein said cross linker component comprises at least one of a carbodiimide, a polyamide epichlorohydrin resin, a polyfunctional aziridine, or mixtures thereof and said cross linker component is present in an amount of from 1 to 25% by weight based on the total ombined active cross linker and active functional polymer component weight.

6. A water-based adhesive composition as recited in claim 1 further comprising at least one of a phosphonate, a phosphate, a wetting agent, a non-ionic surfactant, vanadium pentaoxide, molybdenum, chromium, cysteine, or mixtures thereof.

7. A water-based adhesive composition; said adhesive composition comprising:
    an aqueous dispersion or emulsion of a polymer component, wherein said polymer component consists of a maleated polypropylene polymer component having a plurality of carboxylic acid groups, wherein said carboxylic acid groups are inactive in said adhesive composition as prepared;
    a water-soluble, or water emulsion, or dispersion of a cross linker component, said cross linker component consisting of at least one selected from the group consisting of ammonium zirconium carbonate, zinc ammonium zirconium carbonate, a carbodiimide, a polyamide epichlorohydrin resin, a polyfunctional aziridine, and mixtures thereof and said cross linker component having functional groups wherein said functional groups are reversibly inactive in said adhesive composition as prepared; and
    wherein said adhesive composition has a pH of from 7 to 11 and wherein said carboxylic acid groups on said polymer component and said functional groups on said cross linker component becomes reactive with each other by at least one of volatization of ammonia, heated drying, a shift in pH, dehydration, or a combination thereof.

8. A water-based adhesive composition as recited in claim 7 wherein said cross linker functional groups are capable of bonding to said functional polymer component and a metal substrate.

9. A water-based adhesive composition as recited in claim 7 wherein said cross linker component comprises at least one of ammonium zirconium carbonate, zinc ammonium zirconium carbonate, or a mixture thereof and said cross linker component is present in an amount of from 1 to 50% by weight based on the total combined active cross linker and active functional polymer component weight.

10. A water-based adhesive composition as recited in claim 7 wherein said cross linker component comprises at least one of ammonium zirconium carbonate, zinc ammonium zirconium carbonate, or a mixture thereof and said cross linker component is present in an amount of from 25 to 50% by weight based on the total combined active cross linker and active functional polymer component weight.

11. A water-based adhesive composition as recited in claim 7 wherein said cross linker component comprises at least one of a carbodiimide, a polyamide epichlorohydrin resin, a polyfunctional aziridine, or mixtures thereof and said cross linker component is present in an amount of from 1 to 25% by weight based on the total combined active cross linker and active functional polymer component weight.

12. A water-based adhesive composition as recited in claim 7 further comprising at least one of a phosphonate, a phosphate, a wetting agent, a non-ionic surfactant, vanadium pentaoxide, molybdenum, chromium, cysteine, or mixtures thereof.

13. A water-based adhesive composition; said adhesive composition consisting essentially of:
    an aqueous dispersion or emulsion of a polymer component, wherein said polymer component consists of a maleated polypropylene polymer component having a plurality of carboxylic acid groups, wherein said carboxylic acid groups are inactive in said adhesive composition as prepared;
    a water-soluble, or water emulsion, or dispersion of a cross linker component, said cross linker component consisting of at least one selected from the group consisting of ammonium zirconium carbonate, zinc ammonium zirconium carbonate, a carbodiimide, a polyamide epichlorohydrin resin, a polyfunctional aziridine, and mixtures thereof and said cross linker component having functional groups wherein said functional groups are reversibly inactive in said adhesive composition as prepared;
    optionally further comprising at least one of a phosphonate, a phosphate, a wetting agent, a non-ionic surfactant, vanadium pentaoxide, molybdenum, chromium, cysteine, or mixtures thereof; and
    wherein said adhesive composition has a pH of from 7 to 11 and wherein said carboxylic acid groups on said polymer component and said functional groups on said cross linker component becomes reactive with each other by at least one of volatization of ammonia, heated drying, a shift in pH, dehydration, or a combination thereof.

14. A water-based adhesive composition as recited in claim 13 wherein said cross linker functional groups are capable of bonding to said functional polymer component and a metal substrate.

15. A water-based adhesive composition as recited in claim 13 wherein said cross linker component comprises at least one of ammonium zirconium carbonate, zinc ammonium zirconium carbonate, or a mixture thereof and said cross linker component is present in an amount of from 1 to 50% by weight based on the total combined active cross linker and active functional polymer component weight.

16. A water-based adhesive composition as recited in claim 13 wherein said cross linker component comprises at least one of ammonium zirconium carbonate, zinc ammonium zirconium carbonate, or a mixture thereof and said cross linker component is present in an amount of from 25 to 50% by weight based on the total combined active cross linker and active functional polymer component weight.

17. A water-based adhesive composition as recited in claim 13 wherein said cross linker component comprises at least one of a carbodiimide, a polyamide epichlorohydrin resin, a polyfunctional aziridine, or mixtures thereof and said cross linker component is present in an amount of from 1 to 25% by weight based on the total combined active cross linker and active functional polymer component weight.

* * * * *

UNITED STATES PATENT AND TRADEMARK OFFICE
CERTIFICATE OF CORRECTION

| | | |
|---|---|---|
| PATENT NO. | : 8,530,608 B2 | Page 1 of 1 |
| APPLICATION NO. | : 12/889713 | |
| DATED | : September 10, 2013 | |
| INVENTOR(S) | : John D. McGee and Brian D. Bammel | |

It is certified that error appears in the above-identified patent and that said Letters Patent is hereby corrected as shown below:

In the Specification
Column 7, Line 57 "polyimide" should be --polyamide--.
Column 9, Line 30 "Miehem" should be --Michem--.
Column 10, Line 67 "Dequese" should be --Dequest--.

In the Claims
Column 21, Line 13 "ombined" should be --combined--.

Signed and Sealed this
Third Day of March, 2015

Michelle K. Lee
*Deputy Director of the United States Patent and Trademark Office*